Feb. 25, 1969     T. BERILLA     3,429,468
AUTOMATION DEVICE
Filed Oct. 22, 1965
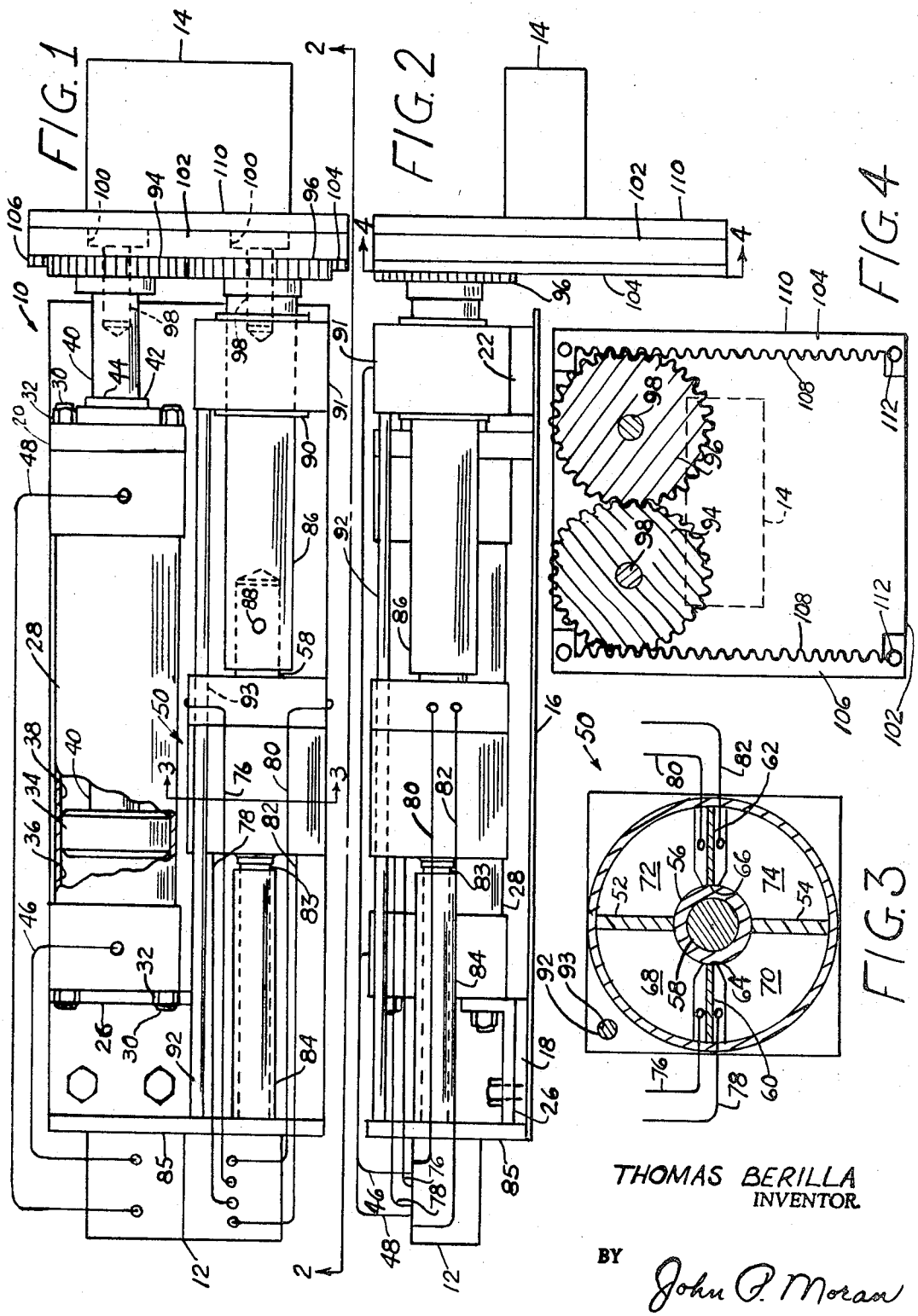
THOMAS BERILLA
INVENTOR.
BY John P. Moran
ATTORNEY United States Patent Office
3,429,468
Patented Feb. 25, 1969

3,429,468
AUTOMATION DEVICE
Thomas Berilla, 2615 Higbee Road,
Adelphi, Md. 20783
Filed Oct. 22, 1965, Ser. No. 500,871
U.S. Cl. 214—670
Int. Cl. B66f 9/00; B25j 11/00
15 Claims

ABSTRACT OF THE DISCLOSURE

This disclosure covers an automation device which is capable of moving a tool, such as a handling mechanism, in any one of an infinite number of directions, as a result of a novel combination of a linear-type cylinder and piston, a rotary-type cylinder and shaft, control means therefor, and a dual gear and rack arrangement. The piston moves a tool mounting plate linearly, while the reciprocating shaft rotates one of the two gears housed in the tool mounting plate. Meshing of said one gear with the other gear and the meshing, in turn, of the two gears with the racks produces the simultaneous vertical motion.

This invention relates generally to automation equipment, and more particularly to automatic placing, transferring and manipulating devices.

In view of the prevalence of automated operations in a large majority of today's industries, there is a need for a compact, reliable and economical device which can move power tools, suction pads or specially designed "fingers" in either an axial or a transverse direction, or in any combination thereof. While the tools which may be maneuvered in this manner may consist of screwdrivers, drills, nut setters, buffers, grinders, oilers, marking devices, paint and glue applicators and inspection gages, the most common application is the directing of finger-like members involved in the pick-up and placement of small oriented parts in assembly operations. Such a device, of course, may also be used to move suction mechanisms which, by alternately gripping and releasing, transfer parts or materials from one location to another, such as from a conveyor to a fixture on an automatic machine tool.

Accordingly, a general object of the invention is to provide a novel, inexpensive device which will efficiently perform the above mentioned multi-directional functions.

Another object of the invention is to provide such a device which may be either hydraulically or pneumatically operated.

A further object of the invention is to provide such a device which may be confined within a relatively small space.

A still further object of the invention is to provide such a device which may be mounted in any position, or on any other type of transfer device which may combine additional motions, such as a rotary motion, for example.

A more specific object of the invention is to provide such a device which includes a coordinated combination of a linear cylinder, a reciprocating rotary actuator and a cooperating rack and gear means.

Other objects and advantages will become more apparent when reference is made to the following specification and the accompanying drawings, wherein:

FIGURE 1 is a plan view of an automated system embodying the invention;

FIGURE 2 is a side elevational view taken along the plane of line 2—2 of FIGURE 1 and looking in the direction of the arrows;

FIGURE 3 is a cross-sectional view taken along the plane of line 3—3 of FIGURE 1 and looking in the direction of the arrows; and FIGURE 4 is a cross-sectional view taken along the plane of line 4—4 of FIGURE 2 and looking in the direction of the arrows.

Referring now to the drawings in greater detail, FIGURES 1 and 2 illustrate a placement or transfer mechanism 10 powered by a suitable hydraulic or pneumatic control system 12, and a handling device or power tool 14, whose combined axial and transverse movements are directed by the mechanism 10.

The particular control system 12 forms no part of the invention and various types of satisfactory controls are currently available for use with the invention. These may consist of any suitable combination of solenoid or pilot operated hydraulic or pneumatic valves, limit switches, timers, cams, and the like. Many combinations of these components are available in assembiles which are readily adaptable for the requirements of the placement or transfer mechanism 10.

The handling device 14 likewise forms no part of the invention and, as previously indicated, may consist of a power tool, a suction device, or specially designed fingers. It is to be understood that when the latter are used, the gripping and releasing functions thereof may be accomplished by using separate electrical hydraulic or pneumatic control equipment.

The placement or transfer mechanism 10 includes a base plate 16 which may have suitable spacers 18, 20 and 22 secured thereto by any suitable means. An L-shaped bracket 26 may be mounted on the spacer 18 for supporting one end of a cylinder 28, the other end being supported on the spacer 20. Stud bolts 30 and nuts 32 serve to hold the cylinder components together between the bracket 26 and the spacer 20.

A piston 34 is slidably mounted in the cylinder 28 forming a movable wall between chambers 36 and 38. A piston rod 40 extends from one side of the piston 34 and through a bushing 42 mounted in an opening 44. Conduits 46 and 48 communicate between the control unit 12 and the chambers 36 and 38, respectively.

A reciprocating rotary actuator 50 is positioned alongside the cylinder 28. As illustrated in FIGURE 3, a pair of vanes 52 and 54 are mounted within the actuator 50 on a sleeve 56 which is fixedly secured to a shaft 58. A pair of fixed walls 60 and 62 are mounted 180° part, intermediate the vanes 52 and 54, respectively. The walls 60 and 62 are mounted such that the sleeve 56 rubs against the inner edges 64 and 66 thereof, the latter serving as seals between chambers 68/70 and 72/74, respectively. A suitable actuator 50 is manufactured by Ex-Cell-O Corp., Greenville, Ohio. Conduits 76, 78, 80 and 82 communicate between the control unit 12 and the chambers 68, 70, 72 and 74, respectively, for a purpose which will be described later.

Referring once again to FIGURE 1, it may be noted that a smaller diameter extension 83 of the shaft 58 extends rearwardly therefrom, rotatably and slidably mounted within a tube 84, the tube 84 being fixedly secured to an end plate 85. A counterbored shaft 86 is secured to the forward shaft 58 extension by any suitable means, such as a pin 88. The shaft 86 extends through bushings or bearings 90 mounted in a housing 91, the latter being mounted on the spacer 24 (FIGURE 2). A rod 92 extends from the end plate 85 to the housing 91 through an opening 93 formed in the collar of the actuator 50.

A pair of gears 94 and 96 are abutted against lockwashers 97 and connected to the internally threaded ends of the piston 40 and the shaft 86, respectively, one possible connection being by screws 98 whose heads are confined within counterbored openings 100 formed in a rack 102. A pair of guides 104 and 106, each having teeth 108 formed thereon, are mounted on one side of the rack 102 adjacent the gears 96 and 94, respectively, and a face plate 110 is secured to the outer side of the rack 102, the guides, rack and face plate being held together by bolts 112.

Operation

Assume now, for purposes of illustration, that the device 14 is an independently actuated suction mechanism. If, in a typical application, a conveyor were passing beneath the mechanism 14 with equally spaced parts sitting thereon, the energization of the control mechanism 12 would be synchronized with the conveyor movement. The hydraulic of pneumatic signal from the unit 12 to the chambers 68 and 74 via the conduits 76 and 82 would cause the vanes 52 and 54 to rotate in a clockwise direction (FIGURE 3). This would, in turn, rotate the shafts 58 and 86, and the gear 96.

As better seen in FIGURE 4, rotation of the gear 96 in a clockwise direction would cause the guide 104 to lower and would rotate the gear 94 in a counterclockwise direction. The gear 94 would, in turn, simultaneously lower the guide 106. Then, once the suction mechanism 14 contacts and picks up the predetermined part, the hydraulic or pneumatic signal from the control unit 12 would shift from the chambers 68 and 74 to the chambers 70 and 72, reversing the direction of rotation of the vanes 52 and 54 and the associated gears 96 and 94. This, of course, would raise the guides 104 and 106 and the associated mechanism 14.

At the same time that the guides 104 and 106, the rack 102, the face plate 110, and the mechanism 14 are being raised, an additional signal from the control unit 12 to the chamber 36 of the cylinder 28 could cause the piston 34, the rod 40 and the gear 94 to move to the right in FIGURE 1. The associated members 102 and 110 would likewise move, drawing the shaft 86 through the bushings 90, the actuator 50 along the rod 92, and the shaft 83 further out of the tube 84.

Thus we see that independent or simultaneous axial and transverse movements of a mechanism 14 are possible as a result of coordinated actuations of the piston 34 and the vanes 52 and 54. It may be realized that once the mechanism 14 has been moved to some predetermined location, such as to a jig or fixture on a machine tool, the part which it carries may be independently released and/or placed therein, and the unit 14 retracted to repeat the cycle.

It should be apparent that the size and stroke of the placement or transfer mechanism 10 is limited only by the size of the cylinders 28 and actuators 50 which are available. The axial range could vary, for example, from 3 inches to 20 feet and the cylinder bores increased to handle relatively heavy loads. It should also be apparent that the mechanism 10 may be mounted in any position to accommodate any desired directional movements, and that there are numerous assembly, packaging and machining applications for which such a mechanism is applicable.

While but one embodiment has been shown and described, it is apparent that other embodiments are possible.

What I claim as my invention is:

1. A transfer and placement mechanism comprising a first member to be moved, first means operatively connected to said first member for moving said first member linearly, a second member operatively connected to said first member, second means operatively connected to said second member for rotating said second member, third means operatively connected to said second member and to said first means for translating said rotary movement of said second member to linear movement of said first member, said latter linear movement being transverse of said first mentioned linear movement and fourth means for causing both movements of said first member to take place simultaneously.

2. The device described in claim 1, wherein said first means is a powered cylinder.

3. The device described in claim 2, wherein said cylinder is pneumatically powered.

4. The device described in claim 2, wherein said cylinder is hydraulically powered.

5. The device described in claim 1, wherein said second means is a powered reciprocating rotatable actuator.

6. The device described in claim 5, wherein said actuator is pneumatically powered.

7. The device described in claim 5, wherein said actuator is hydraulically powered.

8. The device described in claim 1, wherein said second member is a gear.

9. The device described in claim 8, wherein said third means is a rack and guide having teeth formed along a straight edge thereof, said teeth meshing with the teeth of said gear.

10. The mechanism described in claim 1, including, additionally, a handling device fixedly secured to said first member.

11. A placement and transferring mechanism comprising a fixed base having mounted thereon a linear-type cylinder, a rotary actuator, control means operatively connected to said cylinders for powering said cylinders, means for causing a portion of said rotary actuator to move linearly with a portion of said linear-type cylinder, a power tool, means operatively connected between said cylinders and said power tool for moving said power tool in any one of an infinite number of directions resulting from two distinct simultaneously directional movements.

12. A placement and transferring mechanism comprising a fixed base having mounted thereon a linear-type cylinder, a rotary actuator, control means operatively connected to said cylinders for powering said cylinders, means for causing a portion of said rotary actuator to move linearly with a portion of said linear-type cylinder, a handling device, means operatively connected between said cylinders and said handling device for moving said handling device in any one of an infinite number of directions resulting from two distinct simultaneous directional movements.

13. The device described in claim 12, wherein said last mentioned means is a dual gear and dual rack and guide arrangement, wherein one of said dual gears is operatively connected to each of said cylinders.

14. A transfer mechanism comprising a first cylinder, a piston slidably and rotatably mounted in said first cylinder, a piston rod extending from said piston through the end of said first cylinder, means for moving said piston, a second cylinder, a shaft axially aligned in said second cylinder, means for causing said shaft to move linearly with said piston, a vane fixedly secured to said shaft for rotation within said second cylinder, means for rotating said vane, a first gear fixedly secured to said piston rod, a second gear fixedly secured to said shaft, said gears meshing with one another, and a member having teeth formed along two straight edges thereof, said teeth meshing with said first and second gears.

15. The mechanism described in claim 14, including, additionally, a tool fixedly secured to said member.

References Cited

UNITED STATES PATENTS

| 3,173,555 | 3/1965 | Kaye | 214—1 |
| 522,252 | 7/1894 | Garrison | 187—19 X |
| 1,554,584 | 9/1925 | Lake | 214—16.1 |
| 2,437,806 | 3/1948 | Dempster | 214—670 X |

GERALD M. FORLENZA, *Primary Examiner.*

F. E. WERNER, *Assistant Examiner.*

U.S. Cl. X.R

214—1